ns
3,436,406
PRODUCTION OF α,α-DISUBSTITUTED-
β-PROPIOLACTONES
Masataka Nakahara, Takatsuki, Yasuhiro Ogawa, Suita, Yasuhiro Iizuka, Toyonaka, and Yoshihiro Osada, Osaka-fu, Japan, assignors to Kanegafuchi Boseki Kabushiki Kaisha, Tokyo, Japan
No Drawing. Filed Apr. 25, 1966, Ser. No. 544,686
Claims priority, application Japan, May 4, 1965, 40/26,326; July 27, 1965, 40/45,720; Dec. 13, 1965, 40/76,951
Int. Cl. C07d 3/00
U.S. Cl. 260—343.9                     7 Claims

ABSTRACT OF THE DISCLOSURE

The present invention relates to a process of pyrolyzing β-acyloxy-α,α-disubstituted-propionic acids to the corresponding α,α-disubstituted-β-propiolactones in the presence or absence of a metal oxide or metal acetate catalyst.

---

The present invention relates to a process for preparing α,α-disubstituted-β-propiolactones of the general formula:

(I)
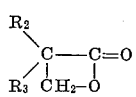

characterized by the thermal decomposition or pyrolysis of β-acyloxy-α,α-disubtituted-propionic acids of the general formula:

(II)
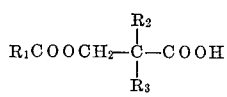

wherein $R_1$ represents a hydrogen atom or an alkyl group of 1 to 2 carbon atoms, $R_2$ represents an alkyl group of 1 to 4 carbon atoms and $R_3$ represents an akyl group of 1 to 4 carbon atoms or phenyl group.

The α,α-disubstituted-β-propiolactones are useful in the high polymer industry as the starting material of synthetic resins and synthetic fibers and also in the pharmaceutical industry and have been heretofore prepared by a variety of methods. For example, in the specification of U.S. Patent. No. 2,356,459 there is described the well-known method for preparing α,α-dimethyl-β-propiolactone by the addition reaction of dimethylketone and formaldehyde, and also in the specification of German Patent No. 1,167,-809 there is described a method for preparing the said lactone by reacting monohalopivalic acid with an equimolar amount of a metal base at 100 to 300° C. in a solvent of a high-boiling point. In addition, in the specifica- of Canadian Patent No. 549,347 there is described a method for preparing α,α-bis-(chloromethyl)-β-propiolactone by thermal decomposition of silver β,β',β''-trichloropivalate.

However, these known methods can be practiced on an industrial scale only with difficulties and involve many economical disadvantages.

During the course of the study on the syntheses of lactones, we have discovered a simple process for preparing α,α-disubstituted-β-propiolactone which is essentially different from the above-mentioned methods. Thus, we have found that the decarboxylation by the thermal decomposition of β-acyloxy-α,α-disubstituted-propionic acid results in the formation of α,α-disubstituted-β-propiolactone.

We have also found that this decarboxylating thermal decomposition is promoted when conducted in the presence of a catalyst selected from the group consisting of metal acetates and metal oxides.

The reaction of this invention may be illustrated by the following equation:

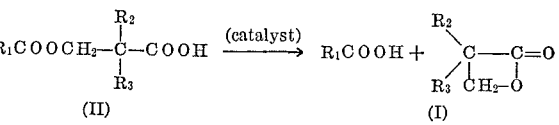

In the above formulae, $R_1$ represents a hydrogen atom or an alkyl group of 1 to 2 carbon atoms, $R_2$ represents an alkly group of 1 to 4 carbon atoms and $R_3$ represents an alkyl group of 1 to 4 carbon atoms or phenyl group.

The reaction of the present invention producing α,α-disubstituted-β-propiolactones (hereinafter referred to as "β-lactone") from β - acyloxy - α,α-disubstituted-propionic acids may be carried out in a gaseous phase. Thus the reaction is practiced by passing the starting material under reduced pressure through a reactor or a layer of the catalyst kept at a high temperature. The process is advantageous in that the reactant and the product are kept at the high temperature only for a short time, the concentration of the reactant is low and the continuous operation is possible.

Examples of the starting propionic acids of the Formula II are β - formyloxy-α,α-dimethylpropionic acid, β - formyloxy-α,α-diethylpropionic acid, β-formyloxy-α-ethyl - α-propylpropionic acid, β-formyloxy-α,α-dipropylpropionic acid, β - formyloxy-α,α-dibutylpropionic acid, β - formyloxy-α-methyl-α-phenylpropionic acid, β-formyloxy-α-ethyl-α-phenylpropionic acid, β-acetoxy-α,α-dimethylpropionic acid, β - acetoxy - α,α - diethylpropionic acid, β - acetoxy - α - methyl - α - ethylpropionic acid, β - acetoxy - α - methyl - α - propylpropionic acid, β - propionyloxy - α,α - dimethylpropionic acid, β - propionyloxy - α-methyl-α-ethylpropionic acid, etc.

Examples of the β-lactones of the Formula I to be obtained by the method of the this invention are α,α-dimethyl - β - propiolactone, α-methyl-α-ethyl-β-propiolactone, α - methyl-α-propyl-β-propiolactone, α,α-diethyl-β-propiolactone, α-ethyl-α-propyl-β-propiolactone, α,α-dipropyl-β-propiolactone, α - propyl-α-butyl-β-propiolactone, α,α-dibutyl-β-propiolactone, α-ethyl-α-butyl-β-propiolactone, α-methyl - α - phenyl-β-propiolactone, α-ethyl-α-phenyl-β-propiolactone, etc.

The reaction temperature of the present process should be determined depending on the use or non-use of the catalyst and also on the particular catalyst employed and the contact time, and may range from 150 to 500° C., preferably from 220 to 380° C. Generally, the reaction does not proceed when the temperature is too low, while side reactions increase when the temperature is too high.

The present reaction may be carried out preferably under reduced pressure. The pressure significantly affects the reaction and has connection with change of the produced β-lactone. The pressure may range usually from 1 to 760 mm. Hg preferably from 10 to 100 mm. Hg.

In the present reaction, a carrier gas may also be employed. In this case, an inert gas like nitrogen or carbon dioxide which is inert to the reactant and stable at the given temperature is effective. Especially when the reaction is carried out at atmospheric pressure, the reaction may be advantageously performed under the flow of a carrier gas to avoid local overheating of the reactant. Furthermore, in the present invention there may be employed pumice, crushed clay plate, activated alumina and the like so as to increase the efficiency of the thermal decomposition reaction.

It is preferable to employ a catalyst in carrying out the reaction of this invention. Any of metal compounds or metal bases which are capable of forming stable or metastable β-acyloxy-α,α-disubstituted-propionic acid salts may be used as the catalyst. Examples of preferred catalysts are metal oxides and metal acetates.

As for the metal oxides, oxides of copper, silver, magnesium, calcium, zinc, barium, cadmium, aluminium, cerium, thallium, silicon, tin, lead, antimony, bismuth, chromium, manganese, iron, cobalt, nickel, etc. may be exemplified.

Examples of acetates are those of lithium, sodium, potassium, magnesium, zinc, cadmium, thallium, cerium, lead, etc.

The catalyst which may be suitably deposited on or shaped with a carrier such as pumice, silica gel and kieselguhr is packed in a fixed-bed or a fluidized-bed reactor and utilized for the reaction.

The contact time in the present gas-phase catalytic reaction is not critical but depends on the reaction temperature and the kind of the catalyst used. However, it is preferable that in general the contact time is relatively short, and it may range from 0.01 to 1 second.

Since the thus-produced $\beta$-lactone is easily changed under the present reaction conditions, it is desirable that the said $\beta$-lactone is quickly cooled. The thus-obtained product may be fractionated and rectificated under reduced pressure to obtain the $\beta$-lactone of high purity, and this can be utilized for polymerization.

As shown above, the process for preparing the said $\beta$-lactones by thermal decomposition or gas-phase catalytic reaction, catalyzed by a metal oxide or acetate, of $\beta$-acyloxy-$\alpha,\alpha$-disubstituted-propionic acids is essentially different from the known methods employing expensive materials and may be advantageously carried out in a continuous manner using a simple apparatus. Furthermore, the present process may be simply and economically practiced on an industrial scale and thus is of great industrial value.

The following examples are given for illustration only and not for limiting the invention in any way.

Example 1

In a flask, 36 g. of $\beta$-acetoxy-$\alpha,\alpha$-dimethylpropionic acid are heated at 120° C. and evaporated at a pressure of 10 mm. Hg while passing nitrogen gas therein. The resulting vapor is introduced into a tube of 1 cm. in diameter and 4 cm. in length, filled with pumice. The reaction tube is heated at 300° C. with an electric furnace. After the thermal treatment for about 30 minutes, the product is collected by cooling in a trap. After the thermal decomposition reaction is completed, the product mixture in the trap is distilled under reduced pressure to give 1.2 g. of a fraction boiling at 45° C./10 mm. Hg. The infrared absorption spectrum of the compound shows a strong band at 1810 cm.$^{-1}$ characteristic of the $\beta$-lactone. The elementary analysis is as follows.

*Analysis.*—Cald. for $C_5H_8O_2$: C, 60.0%; H, 8.0%. Found: C, 59.6%; H, 8.2%.

From the above results, the material is provided to be $\alpha,\alpha$-dimethlypropiolactone.

Example 2

In a flask, there are placed 30 g. of $\beta$-formyloxy-$\alpha,\alpha$-dimethylpropionic acid which are heated to boiling at 130° C. while slowly passing a stream of nitrogen therein. The resulting vapor is passed at a pressure of 20 mm. Hg through a 20 cm. glass tube, and the product is collected in a trap. All the reactant is treated over a period of 30 minutes at 180° C. for the thermal decomposition. After the reaction is completed, the product mixture in the trap is distilled under reduced pressure to give 3.5 g. of a fraction of the same boiling point as that in Example 1. The gas chromatogram of the thus-obtained compound shows the same retention time as that of the compound obtained in Example 1, and the infrared absorption spectrum is identical with that of the compound of Example 1, showing a band at 1810 cm.$^{-1}$ characteristic of the $\beta$-lactone. Thus, the product is identified with $\alpha,\alpha$-dimethyl-$\beta$-propiolactone.

Example 3

In a flask, 37.6 g. of $\beta$-propiolyloxy-$\alpha$-methyl-$\alpha$-ethylpropionic acid are heated at 200° C. and evaporated at a pressure of 10 mm. Hg while slowly passing a stream of nitrogen therein. The resulting vapor is passed through a tube of 1 cm. in diameter and 4 cm. long, packed with pumice and kept at 350° C. After 30 minutes, the product is collected by cooling in a trap. The product mixture is distilled under reduced pressure to give 1.0 g. of a fraction boiling at 64° C./18 mm. Hg. The infrared absorption spectrum of this compound shows a band characteristic of the $\beta$-lactone and the elementary analysis agrees with the formula of $\alpha$-methyl-$\alpha$-ethyl-$\beta$-propiolactone.

Example 4

In a flask, 34.8 g. of $\beta$-formyloxy-$\alpha$-methyl-$\alpha$-propylpropionic acid are heated at 200° C. and evaporated at a pressure of 7 mm. Hg while passing nitrogen therein. The resulting vapor is passed through a tube of 1 cm. in diameter and 4 cm. long, packed with pumice and kept at 300° C. After 30 minutes, the product is collected by cooling in a trap. Then, the product mixture is distilled under reduced pressure to give 2.7 g. of a fraction boiling at 59° C./ mm. Hg. The infrared absorption spectrum of this compound shows a band characteristic of the $\beta$-lactone and the elementary analysis reveals that the compound is $\alpha$-metyhl-$\alpha$-propyl-$\beta$-lactone.

Example 5

Twenty-three grams of $\beta$-formlyoxy-$\alpha,\alpha$-dibutylpropionic acid are subjected to thermal decomposition under the same conditions as in Example 3, and distillation of the product under reduced pressure gives 1.2 g. of a compound boiling at 90° C./1 mm. Hg. The analysis revealed that the compound is $\alpha,\alpha$-dibutyl-$\beta$-propiolactone.

Example 6

The zinc oxide catalyst (oxide/carrier=10%) is prepared by immersing 40 mesh of pumice (as the carrier) in an aqueous solution of zinc nitrate, evaporating to dryness and then roasting the resulting residue at 500° C. to decompose the zinc nitrate. Six milliliters of the catalyst are packed in a quartz-glass tube of 10 mm. in diameter and 100 mm. in length, used as the reactor, said catalyst being set ca. 30 mm. apart from the exit of the tube. The reactor is heated at 350° C. with a tubular electric furnace, and thereto $\beta$-acetoxy-$\alpha,\alpha$-dimethylpropionic acid is charged at a rate of 4.6 g. catalyst·minute/mmole from an evaporator. The pressure at the reactor is 40 mm. Hg. The catalyst bed in the reactor is kept at 350° C. The section of the reactor which is not packed with the catalyst acts as a preheater for the gas. It is desirable that the preheating section is so effective as to heat the gas to the reaction temperature in a short time.

The gas composition under these conditions is 50% of $\beta$-acetoxy-$\alpha,\alpha$-dimethylpropionic acid and 50% of nitrogen, and the average contact time is 0.1 second.

The gas discharged from the reactor is condensed and collected in a trap by cooling with air and then with a Dry Ice-methanol cooling medium. The product mixture collected in the trap is distilled to give a fraction boiling at 45° C./10 mm. Hg. The infrared absorption spectrum of this compound shows a strong band at 1810 cm.$^{-1}$ characteristic of the $\beta$-lactone. The elementary analysis is as follows:

*Analysis.*—Calcd. for $C_5H_8O_2$: C, 60.0%; H, 8.0%. Found: C, 59.8%; H, 8.2%.

From the above results, the product is proved to be $\alpha,\alpha$-dimethyl-$\beta$-propiolactone. Furthermore, gas chromatographic and chemical analyses reveal that another product is acetic acid. Product analysis shows that conversion of $\beta$-acetoxy-$\alpha,\alpha$-dimethylpropionic acid is 26.7%, selectivity of acetic acid is 99.8% and selectivity of the lactone is 64.7%.

Example 7

The catalyst (oxide/carrier=10%) is prepared by immersing 40 mesh pumice in an aqueous solution of cobalt nitrate, evaporating to dryness and then roasting the residue at 500° C. The said catalyst is placed in the same reactor as used in Example 6 and kept at 300° C. β-Propionyloxy-α-methyl-α-ethylpropionic acid is charged at a rate of 4.6 g. catalyst·minute/mmole from an evaporator. The pressure is 20 mm. Hg.

The gas discharged from the reactor is collected in a trap by cooling. The product mixture is distilled to give a fraction boiling at 63° C./16 mm. Hg. The infrared absorption spectrum of this compound shows a band characteristic of the β-lactone, and the elementary analysis agrees with the formula of α-methyl-α-ethyl-β-propiolactone. Further product analysis shows that conversion of β-propionyloxy-α-methyl-α-ethylpropionic acid is 21.2%, selectively of the lactone is 59.8% and selectivity of propionic acid is 91.2%.

Example 8

The same reactor as that of Example 6 is utilized with a nickel oxide catalyst (oxide/carrier=10%). The reaction temperature is 350° C. and β-formyloxy-α-methyl-α-butylpropionic acid is charged at a rate of 4.6 g. catalyst·minute/mmole from an evaporator. The pressure is 10 mm. Hg. The gas discharged from the reactor is collected in a trap by cooling, and then the condensate is distilled under reduced pressure to give a fraction boiling at 60° C./1.5 mm. Hg. The infrared absorption spectrum of this compound shows a band characteristic of the β-lactone, and the elementary analysis fits the formula of α-methyl-α-butyl-β-propiolactone. Conversion of β-formyloxy-α-methyl-α-butylpropionic acid is 37.4%, selectivity of the lactone is 51.5% and selectivity of formic acid is 87.6%.

Example 9

The same reactor as that of Example 6 is used, filled with 6 ml. of a catalyst (oxide/carrier=10%) prepared by immersing pumice in a solution of antimony nitrate, drying the mixture to dryness and then roasting the residue at 500° C. The reactor is kept at 350° C. β-Acetoxy-α-methyl-α-ethyl-propionic acid is charged at a rate of 4.6 g. catalyst·minute/mmole from an evaporator. The pressure is 100 mm. Hg.

The product collected in a cooling trap is distilled under reduced pressure, and a fraction boiling at 63° C./16 mm. Hg is collected. The infrared absorption spectrum shows a band characteristic of the β-lactone, and the elementary analysis fits the formula of α-methyl-α-ethyl-β-propiolactone. Conversion of β-acetoxy-α-methyl-α-ethylpropionic acid is 56%, selectivity of the lactone is 46% and selectivity of acetic acid is 98.2%.

Example 10

The same reactor as that of Example 6 is utilized, and in the reactor there is placed a catalyst (oxide/carrier=10%) prepared by soaking pumice with a solution of aluminum nitrate, evaporating the mixture to dryness and then roasting the residue at 500° C. β-Acetoxy-α,α-dimethylpropionic acid is charged at a rate of 9.6 g. catalyst·minute/mmole to the reactor kept at 300° C. The pressure is 10 mm. Hg. The product mixture collected by cooling to condense in a trap is distilled, and a fraction boiling at 45° C./10 mm. Hg is collected. The analyses of the product show the same results as those of Example 6, and the product is proved to be α,α-dimethyl-β-propiolactone. Conversion of β-acetoxy-α,α-dimethylpropionic acid is 42%, selectivity of the lactone is 51% and selectivity of acetic acid is 86%.

Example 11

According to the procedure of Example 6, β-acetoxy-α,α-dimethylpropionic acid is decomposed under the same conditions with varying catalyst (oxide/carrier=10%). The product mixture collected in a cooling trap is analyzed by gas chromatography. The retention times of the two products are found to be identical with those of α,α-dimethyl-β-propiolactone and acetic acid. The formation of the said β-lactone and acetic acid is approved further by comparison of the infrared absorption spectra of the fractions with those of authentic samples. The catalysts employed and the yields of the lactone are shown in the following table.

| Metal of the catalyst oxide: | Yield (percent) |
|---|---|
| Copper | 23.0 |
| Silver | 23.1 |
| Calcium | 18.2 |
| Cadmium | 29.5 |
| Cerium | 16.7 |
| Thallium | 15.4 |
| Silicon | 5.2 |
| Barium | 12.4 |
| Tin | 11.7 |
| Lead | 21.2 |
| Bismuth | 19.9 |
| Chromium | 14.8 |
| Manganese | 20.2 |
| Iron | 12.1 |
| Magnesium | 15.7 |

Example 12

With the same reactor and catalyst as in Example 6, β-acetoxy-α,α-dimethylpropionic acid is charged at a rate of 15.0 g. catalyst·minute/mmole. The catalyst layer is kept at 350° C. and the pressure is 10 mm. Hg. The gaseous product discharged from the reactor is collected in a cooling trap. The product mixture in the trap is subjected to gas chromatography and is confirmed to be α,α-dimethyl-β-propiolactone and acetic acid. Conversion of β-acetoxy-α,α-dimethylpropionic acid is 60.8%, selectivity of the lactone is 90.4% and selectivity of acetic acid is 95.0%.

Example 13

A catalyst is prepared by soaking 60 mesh of Celite (carrier) with a 10% (by weight) aqueous solution of sodium acetate and then evaporating the mixture to dryness. Six milliliters of the catalyst are packed in a glass tube, 15 mm. in diameter and 250 mm. in length, used as the reactor, said catalyst being set ca. 60 mm. apart from the exit of the tube. The reactor is heated at 300° C. in a tubular electric furnace, and thereto 64.6 mmole of β-acetoxy-α,α-dimethylpropionic acid are charged at a rate of 10.84 g. catalyst·minute/mmole together with $N_2$ at a rate of 25 seconds/ml. from an evaporator. The pressure at the reactor is 10 mm. Hg and that at the evaporator is 8 mm. Hg. The catalyst bed in the reactor is kept at 300° C. The section of the reactor which is not packed with the catalyst acts as the pre-heater for the gas. The gas discharged from the reactor is collected in a trap by cooling with air and then with a Dry Ice-methanol cooling medium. The product mixture in the trap is distilled to give a fraction boiling at 45° C./10 mm. Hg. The infrared absorption spectrum of this compound shows a strong band at 1810 cm.$^{-1}$ characteristic of the β-lactone. The elementary analysis is as follows:

Analysis.—Calcd. for $C_5H_8O_2$: C, 60.0%; H, 8.0%. Found: C, 59.8%; H, 8.1%.

From the above results, the product is proved to be α,α-dimethyl-β-propiolactone. Furthermore, gas chromatographic and chemical analyses reveal that another product is acetic acid. Product analysis shows that conversion of β-acetoxy-α,α-dimethylpropionic acid is 100%, selectivity of the lactone is 69.59% and selectivity of acetic acid is 85.74%.

Example 14

A catalyst is prepared by soaking 60 mesh Celite with an aqueous solution of magnesium acetate (10% by weight of Celite) and then evaporating the mixture to dryness. Six milliliters of the said catalyst are placed in the same reactor as used in Example 13 and kept at 300° C. Thereto and at a pressure of 10 mm. Hg, 63.8 mmole of β-propionyloxy-α-methyl-α-ethylpropionic acid are charged at the ratio of 9.97 g. catalyst·minute/mmole together with nitrogen gas. The gaseous product discharged from the reactor is collected in a trap by cooling with a Dry Ice-methanol cooling medium. The product mixture is distilled to give a fraction boiling at 63° C./16 mm. Hg. The infrared absorption spectrum of this compound shows a band characteristic of the β-lactone, and the elementary analysis agrees with the formula of α-methyl-α-ethyl-β-propiolactone. Further product analysis shows that conversion of β-propionyloxy-α-methyl-α-ethylpropionic acid is 71.7%, selectivity of the lactone is 59.6% and selectivity of propionic acid is 80.8%.

Example 15

The same reactor as that of Example 13 is utilized with 6 ml. of a catalyst prepared by soaking pumice (the carrier) with a 10% (by weight) solution of lead acetate followed by drying. The reaction temperature is 300° C. and 62.9 mmole of β-formyloxy-α-methyl-α-butylpropionic acid are charged at the ratio of 11.13 g. catalyst·minute/mmole with $N_2$ from an evaporator. The pressure is 20 mm. Hg. The gas discharged from the reactor is collected in a trap by cooling, and the condensate is distilled under reduced pressure to give a fraction boiling at 60° C./1.5 mm. Hg. The infrared absorption spectrum of this compound shows a band characteristic of the β-lactone, and the elementary analysis fits the formula of α-methyl-α-butyl-β-propiolactone. Conversion of β-formyloxy-α-methyl-α-butylpropionic acid is 65.4%, selectivity of the lactone is 61.2% and selectivity of formic acid is 71.1%.

Example 16

The same reactor as that of Example 13 is used. The reactor is packed with a catalyst which is prepared by soaking Celite with a 10% (by weight) solution of cadmium acetate followed by drying. The reactor is kept at 350° C. From an evaporator, 62.2 mmole of β-acetoxy-α-methyl-α-ethylpropionic acid are charged, together with $N_2$, at the ratio of 89.5 g. catalyst·minute/mmole and at a pressure of 100 mm. Hg. The product collected in a cooling trap is distilled under reduced pressure, and a fraction boiling at 63° C./16 mm. Hg is collected. The infrared absorption spectrum shows a band characteristic of the β-lactone, and the elementary analysis fits the formula of α-methyl-α-ethyl-β-propiolactone. Conversion of β-acetoxy-α-methyl-α-ethylpropionic acid is 66%, selectivity of the lactone is 46.1% and selectivity of acetic acid is 88.5%.

Example 17

According to the procedure of Example 13, β-acetoxy-α,α-dimethylpropionic acid is decomposed under the same conditions but with varying catalysts. The product mixture collected in the cooling trap is analyzed by gas chromatography. The retention times of the two products are found to be identical with those of α,α-dimethyl-β-propiolactone and acetic acid. The formation of the said β-lactone and acetic acid is approved further by comparison of the infrared absorption spectra of the fractions with those of authentic samples. The results obtained with a variety of catalysts are shown in the following table.

It is clear from the above results that the conversion and the selectivity are extremely good when the metal acetates are used as the catalyst.

Example 18

With a reactor same as Example 10 and with a sodium acetate catalyst (acetate/carrier=1% by weight), β-acetoxy-α,α-dimethyl propionic acid is subjected to thermal decomposition. The propionic acid is charged at a rate of 17.0 g. catalyst·minute/mmole. The catalyst layer in the reactor is kept at 250° C. The pressure is 10 mm. Hg. The gaseous product discharged from the reactor is collected in a cooling trap. The product in the trap is gas-chromatographed and found to be α,α-dimethyl-β-propiolactone and acetic acid. The conversion of β-acetoxy-α,α-dimethylpropionic acid is 84.0%, selectivity of the lactone is 93.2% and selectivity of acetic acid is 96.1%.

Example 19

To the same reactor with the same catalyst as in Example 18, β-acetoxy-α-methyl-α-phenyl-propionic acid is charged at a rate of 6.1 g. catalyst·minute/mmole. The catalyst layer is kept at 350° C. and the pressure is 6 mm. Hg. The gaseous product discharged from the reactor is collected in a cooling trap and the product so collected is subjected to fractional distillation to obtain a fraction having a boiling point at 83–86° C./0.6 mm. Hg. The elementary analysis reveals that the product is α-methyl-α-phenyl-β-propiolactone. Conversion of β-acetoxy-α-methyl-α-phenylpropionic acid is 100%, selectivity of the lactone is 84% and selectivity of acetic acid is 97%.

What we claim is:

1. A method for producing α,α-disubstituted-β-propiolactones of the formula:

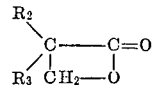

wherein $R_2$ represents an alkyl group of 1–4 carbon atoms and $R_3$ represents a group selected from the group consisting of alkyl groups of 1–4 carbon atoms and phenyl group, which comprises thermally decomposing at a temperature of 150–500° C. a β-acyloxy-α,α-disubstituted-propionic acid of the formula:

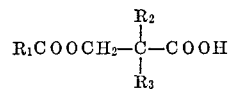

wherein $R_1$ represents a member selected from the group consisting of hydrogen atom and alkyl groups of 1–2 carbon atoms.

2. A method as claimed in claim 1 in which the thermal decomposition is conducted in the presence of a metal oxide catalyst selected from the group consisting of copper, silver, magnesium, calcium, zinc, barium, cadmium, aluminum, cerium, thallium, silicon, tin, lead, antimony, bismuth, chromium, manganese, iron, cobalt and nickel oxides.

3. A method as claimed in claim 1 in which the thermal decomposition is conducted in the presence of a metal acetate catalyst selected from the group consisting of lithium, sodium, potassium, magnesium, zinc, cadmium, thallium, cerium and lead acetates.

4. A method as claimed in claim 1 in which the thermal decomposition is conducted at a temperature of from 220–380° C.

| Metal of the catalyst acetate | Lithium | Potassium | Zinc | Thallium | Cerium | None |
|---|---|---|---|---|---|---|
| Conversion (percent) | 100 | 100 | 44.9 | 38.5 | 40.1 | 3.2 |
| Selectivity of the lactone (percent) | 51.8 | 41.9 | 40.9 | 35.4 | 36.2 | 39.1 |
| Selectivity of acetic acid (percent) | 81.9 | 76.0 | 59.4 | 66.3 | 61.4 | 66.4 |

5. A method as claimed in claim 1 in which the thermal decomposition is conducted at a pressure of 1–760 mm. Hg.

6. A method as claimed in claim 1, wherein the thermal decomposition is conducted at a pressure of 10–100 mm. Hg.

7. A method as claimed in claim 1 in which the thermal decomposition is conducted in the presence of an inert carrier gas.

References Cited

UNITED STATES PATENTS 2,449,994  9/1948  Gresham et al.

ALEX MAZEL, *Primary Examiner.*

J. A. NARCAVAGE, *Assistant Examiner.*